J. MONTGOMERY.
Coffee Pot.
No. 90,676.
Patented June 1, 1869.
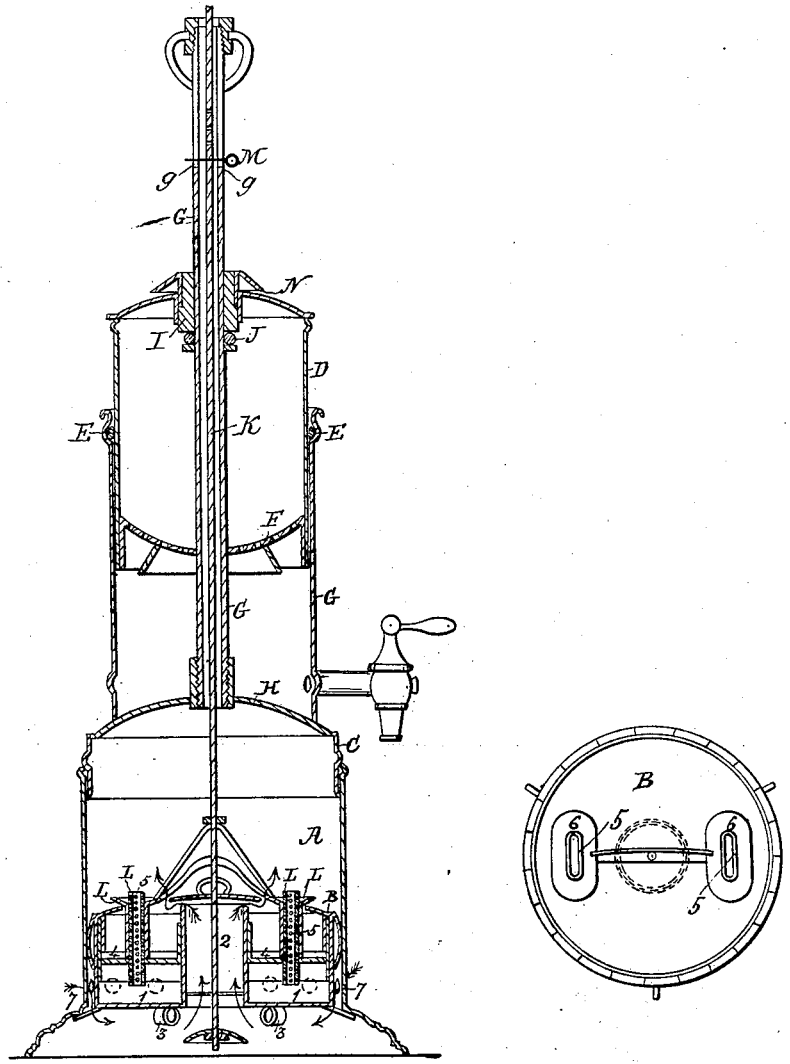
Witnesses.
Philip J. Dom Jr.
Wm. A. Barnard
Inventor.
James Montgomery
by Crosby Halsted & Gould
his attys.

United States Patent Office.

JAMES MONTGOMERY, OF NEW YORK, N. Y.

Letters Patent No. 90,676, dated June 1, 1869.

IMPROVEMENTS IN COFFEE-POTS, BOILERS, DIGESTERS, OVENS, AND LAMPS.

The Schedule referred to in these Letters Patent and making part of the same.

*To all whom it may concern:*

Be it known that I, JAMES MONTGOMERY, of the city, county, and State of New York, have invented certain Improvements in Coffee-Pot, Boiler, and Lamp; and I do hereby declare that the following, taken in connection with the drawings which accompany and form part of this specification, is a description of my invention sufficient to enable those skilled in the art to practise it.

My invention relates to that class of coffee-pots which is designed to be used upon a breakfast-table, and to preserve from escape those aromatic properties, the loss of which detracts materially from the value and flavor of the beverage; and It consists, among other things hereinafter enumerated, of a telescopic arrangement of one hollow cylinder or vessel within another, so that the inner one, which contains the ground coffee, may automatically rise and fall under the action of the steam generated by a lamp or other source of heat, and by means of this rising and falling motion, control the burning of the lamp, or extinguish it, as desired, when the coffee is sufficiently boiled.

The other improvements are mainly incidental to this primary one.

A represents a case or chamber to receive a lamp, B. This chamber is open at the bottom or side, that it may admit of readily introducing into or removing from it the lamp, and it is also open at the top to receive and sustain the telescopic cylinders, and the apparatus connected with them.

C is the outer cylinder, and

D the inner one.

C is open at its top and closed at its bottom, which is made concave, and preferably corrugated or ridged, to offer a larger heating-surface.

D is closed at its top and open at its bottom.

Between C and D, at any convenient place or places, a ring or band, E, of rubber or other packing, is inserted, to make a close joint, but these may be dispensed with, as the inner cylinder extends below the top line of the water, which thus itself forms a close annular packing.

Within the inner cylinder D is snugly fitted, so that its position may be changed at will, a perforated plate, F, which I prefer to make saucer-shaped, as shown.

G is a central tube, screwed at its bottom to the centre of the bottom H, of cylinder C, as shown, and thence extending upwards and out through a screw-plug or stopper I, in the top of cylinder D, a rubber or other packing, J, serving to make a close joint at this point. This tube may be open or closed at its top, and may be surmounted by any appropriate ornamental design.

Within this tube is a metallic rod, K, connected with the lamp, in such manner that if it be lifted it will draw upwards the tubes L L, which surround the wick, and so reduce the flames, more or less, or entirely extinguish them, dependent upon the height to which they are lifted.

Through the upper end of this rod is a series of holes for the reception of a pin, M, the tube being so slotted at this point as to allow the pin to be raised therein, and so lift the rod as above mentioned.

The raising of the outer cylinder will bring it in contact with this pin, and thus lift it and the tubes surrounding the wick. The pin is to be adjusted so that the lamp shall be extinguished shortly after the coffee boils, if to be used immediately, or be partially extinguished at that stage, so as to keep up the heat to any degree desired, or enough, merely, to keep it hot and for any length of time, as long as the lamp may burn.

When the telescopic vessel D, in rising, brings the inner cylinder in contact with M, the rod K being drawn up, as already described, may be elevated high enough to bring the lower end of the slot in the central tube, below the packing-ring J, whereby the steam would be admitted into the central tube, a part of which would escape upwards and the rest downwards, the latter assisting in extinguishing the light, or extinguishing a charcoal fire, if such were used.

The operation of this portion of the apparatus is as follows:

The cylinder, C, being filled partially with water to the height desired, and the ground coffee put into cylinder D, through the aperture at N, and resting on the perforated plate F, and the pin M, being adjusted higher or lower in the rod K, as may be desired for the convenience of the special occasion, the lamp is ignited, and its heat imparted not only to the bottom of cylinder C, but also to the interior of tube G, thus greatly increasing the heating-surface; this tube also serving the purpose of a chimney for the escape of smoke, &c.

When the water boils and steam is generated, its force and pressure will cause the cylinder D to rise, and when stopper I lifts pin M, the tubes L L, around the wicks, will be raised, and the amount of flame and heat reduced accordingly.

The lamp for my coffee-pot and boiler should be adapted for consuming cheap oils and fluids, and be economical and absolutely free from danger of explosion, and to this end I construct it substantially as follows:

1 is a vessel having a central tubular opening as at 2, and so made as to snugly fit in the outer casing A, but with an air-space between them, and to be readily removed therefrom by its handles, as at 3. It may, however, be introduced from the side as well as from beneath. Within this vessel the oil is placed.

A boat or chamber 4, fits snugly within the vessel, and is capable of falling therein by gravity, when not sustained by the liquid or the sheet of air above the same.

This boat or hot-air chamber is cup-shaped, both at top and bottom, and through it, and inserted therein, are two tubular and perforated wick-holders, 5.

Surmounting the whole is a cap, with handles for removing it, and with two spacious openings, 6, through which the tubes project upwards, and a central hole to allow the rod to pass through.

Caps L, with concave copper lips at their tops, are provided for the purpose of surrounding the perforated tubes, and these caps are connected by a wire through a hole, in which also the rod is permitted to pass.

The parts being all in position, as shown in fig. 1, and the chamber 1 filled with oil or other liquid, about two-thirds full, and the wick lighted, the operation is as follows:

Air rushes in from without through the openings 7 7, and following the course of the arrows, passes to the central opening or tube 2, thence upwards and over its top, and to and beneath the copper lips, and thence around their edges to the flame.

The theory of operation of the lamp is as follows:

The route of the air, as heretofore described, keeps the oil-chamber and oil cool, the warm oil imparts its heat to the air, which thence passes upwards to and under the concave lips, which are highly heated by the flame, thereby giving it an exceedingly high temperature, to insure the more perfect combustion of the carbonaceous matter evolved from the burning vapors rising from out the perforated tubes, the kerosene or other illuminating-matter, being made gaseous and vaporous, owing to the high degree of temperature imparted by the copper lips to the metal sheaths surrounding the perforated tubes, the whole being assisted by the warm air, as already described.

As the illuminating-matter is gradually consumed, the boat-like top floating on the surface of the same, slowly sinks, by reason of the air and vapor passing from beneath the float upwards into the flame of the wick and so being consumed. In like manner the oil itself, as it is consumed, causes the further sinking of the boat-like top, until the perforated wick-tubes come in contact with the bottom, when the atmosphere, acting by its pressure, will cut off the further action of the capillaries, thereby indicating the need of refilling the lamp. By this means all formation of a vacuum in the lamp, so prolific a cause of explosions, is prevented, for as no space exists in the apparatus to contain oleaginous or other combustible vapors, it naturally follows that there is nothing to form an explosive mixture, either of vapors to blow up, or of air to combine therewith, there being no vacuous space.

This apparatus, constructed substantially as above described, will be found of great value for the preparation of canned fruits of all descriptions, preserves, and also for canned meats and fish, and the cooking of the same on a large scale.

Ovens for roasting or baking may also be arranged on the same plan, so as, in accordance with my invention, to confine within the vessel and save the essences, essential oils, &c.

Where tough, gelatinous, and gristly meats and bones are to be cooked, requiring a higher temperature, I then propose to hold down the telescopic vessel by pressure, by means of springs, weights, or other analogous devices.

If springs be used, they should be attached to the upper and inner part of the outer vessel, and to the upper and outer part of the inner vessel, thus connecting them together.

The common safety-valve, held down by a spring or weight, may also be employed to hold down and give the requisite pressure.

The rising and falling portion of the lamp proper may have its diameter as much less as may be desired than that of the outer or oil-chamber, and in such case the latter should have the annular space, which would be left between them, covered by attachment secured to the top of the body of the oil-chamber or containing-vessel.

1. I claim the combination, with the outer vessel, of an inner cylinder, arranged to move telescopically and automatically therein, substantially as and for the purpose described.

2. Also the combination, with the inner vessel, of a rod, G, or its equivalent, to control or extinguish the flame of the lamp, substantially as and for the purpose described.

3. Also the employment, as an additional heating-surface, of a tube extending upwards through the liquid, and serving also as a steadying-post or guide, for the rising and falling cylinder, and a sheath for the adjusting-rod.

4. Also the means, substantially as described, for the preliminary adjustment of the height to which the inner vessel shall ascend before diminishing the flame of the lamp.

5. Also I claim, within the oil-chamber, a boat-like top floating therein, and operating substantially as set forth.

6. Also the combination of the perforated tubes descending into the combustible matter, with the sliding sleeves having metallic lips, and operating automatically, substantially as and for the purpose set forth.

7. Also, in combination with the means, substantially as described, of giving to the current of atmospheric air a course downwards, then underneath the lamp, and then upwards along its inner sides, the covered boat 4, serving to confine the current, and direct its exit only through the openings 6, surrounding the wick-tubes.

8. Also a lamp constructed and operating substantially as set forth.

JAMES MONTGOMERY.

Witnesses:
JOHN J. HALSTED,
WM. A. BARNACLO.